US009850850B2

(12) United States Patent
Aten

(10) Patent No.: US 9,850,850 B2
(45) Date of Patent: Dec. 26, 2017

(54) ACOUSTICALLY TREATED THRUST REVERSER TRACK BEAM

(71) Applicant: ROHR, INC., San Diego, CA (US)

(72) Inventor: Michael Aten, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 728 days.

(21) Appl. No.: 14/061,469

(22) Filed: Oct. 23, 2013

(65) Prior Publication Data

US 2015/0108250 A1    Apr. 23, 2015

(51) Int. Cl.
| F02K 1/80 | (2006.01) |
| F02K 1/34 | (2006.01) |
| B64D 29/06 | (2006.01) |
| F02K 1/72 | (2006.01) |
| F02K 1/82 | (2006.01) |
| F02C 7/20 | (2006.01) |

(52) U.S. Cl.
CPC ............... *F02K 1/80* (2013.01); *B64D 29/06* (2013.01); *B64D 33/06* (2013.01); *F02C 7/20* (2013.01); *F02K 1/72* (2013.01); *F02K 1/827* (2013.01); *F05D 2250/11* (2013.01); *F05D 2250/292* (2013.01); *F05D 2260/96* (2013.01)

(58) Field of Classification Search
CPC ... F02K 1/80; F02K 1/72; F02K 1/827; F01C 7/20; B64D 29/06; B64D 33/06; F05D 2260/96; F05D 2250/11; F05D 2250/292
See application file for complete search history.

(56) References Cited

U.S. PATENT DOCUMENTS

| 3,890,060 A * | 6/1975 | Lipstein ................. F04D 29/664 181/214 |
| 3,913,702 A * | 10/1975 | Wirt ....................... B64D 33/06 181/286 |
| 4,509,616 A * | 4/1985 | Blecherman ........... F01D 25/243 181/214 |
| 4,858,721 A * | 8/1989 | Autie ..................... G10K 11/172 181/213 |
| 5,806,302 A * | 9/1998 | Cariola ..................... F02K 1/09 239/265.29 |

(Continued)

FOREIGN PATENT DOCUMENTS

GB      1369434      10/1974

OTHER PUBLICATIONS

Extended European Search Report dated Mar. 6, 2015 in European Application No. 14189824.7.

*Primary Examiner* — Carlos A Rivera
(74) *Attorney, Agent, or Firm* — Snell & Wilmer, L.L.P.

(57) ABSTRACT

A thrust reverser track beam is disclosed. The thrust reverser track beam may comprise a recess defined by a reception surface and/or a perimeter surface surrounding the reception surface and extending away from the reception surface, wherein the reception surface and the perimeter surface bound a recess that is configured to receive a noise suppressing structure. The thrust reverser track beam may further comprise the noise suppressing structure. The recess is generally triangular in shape and may extend away from a plane. The noise suppressing structure may be generally triangular in shape and may extend away from a plane. The noise suppressing structure may be coupled within the recess of the track beam and/or to the track beam.

16 Claims, 4 Drawing Sheets

(56) References Cited

U.S. PATENT DOCUMENTS

| | | | |
|---|---|---|---|
| 6,557,799 B1* | 5/2003 | Sternberger | B64D 33/04 244/110 B |
| 8,820,088 B2* | 9/2014 | Gilson | F02K 1/09 181/215 |
| 9,168,716 B2* | 10/2015 | Benedetti | B32B 15/01 |
| 2006/0043236 A1* | 3/2006 | Campbell | B64D 33/06 244/1 N |
| 2007/0294996 A1 | 12/2007 | Stephan et al. | |
| 2008/0295518 A1* | 12/2008 | Reba | F01D 9/02 60/725 |
| 2009/0297357 A1* | 12/2009 | Ali | F02C 6/206 416/231 R |
| 2011/0133025 A1* | 6/2011 | Vauchel | B64D 33/02 244/1 N |
| 2012/0097761 A1* | 4/2012 | Vache | F02K 1/72 239/265.19 |
| 2012/0248284 A1 | 10/2012 | Bellanger et al. | |
| 2013/0161415 A1 | 6/2013 | Bellanger | |

* cited by examiner

ACOUSTICALLY TREATED THRUST REVERSER TRACK BEAM

FIELD

The present disclosure relates to jet aircraft, and more particularly, to noise suppression systems for jet aircraft.

BACKGROUND

Jet aircraft typically include turbofan propulsion systems (or "jet engines"), such as those that power modern commercial aircraft, typically include thrust reversing structure. These structures often include a translating sleeve configured to expose a cascade during a thrust reversing operation. The translating sleeve translates on a track beam.

SUMMARY

A thrust reverser track beam is disclosed. The thrust reverser track beam may comprise a recess defined by a reception surface and/or a perimeter surface surrounding the reception surface and extending away from the reception surface, wherein the reception surface and the perimeter surface bound a recess that is configured to receive a noise suppressing structure. The thrust reverser track beam may further comprise the noise suppressing structure. The recess is generally triangular in shape and may extend away from a plane. The noise suppressing structure may be generally triangular in shape and may extend away from a plane. The noise suppressing structure may be coupled within the recess of the track beam and/or to the track beam. The noise suppressing structure may be coupled within the recess of the track beam by at least one of: a rivet, a screw, a bolt, a nut, an adhesive, a pressure fitting, and heat bonding. The noise suppressing structure may be coupled to the track beam by way of at least one of: a rivet, a screw, a bolt, a nut, a adhesive, a pressure fitting, or heat bonding.

A thrust reverser track beam is disclosed. The thrust reverser track beam may comprise an elongate member having at least one track, the at least one track configured to receive a housing capable of translating forward an all along the elongate member, the elongate member including a recess having a reception surface for receiving a noise suppressing structure, and/or a cascade array configured to direct airflow during a reverse thrust mode, the housing translating forward to cover the cascade array in a stowed configuration and translating aft to expose the cascade array in a deployed configuration. The thrust reverser track beam may further comprise a perimeter surface surrounding the reception surface and extending away from the reception surface. The reception surface and the perimeter surface may bound the recess, such that the recess is configured to receive a noise suppressing structure. The recess may be generally triangular in shape and may extend away from a plane. The noise suppressing structure may be generally triangular in shape and may extend away from a plane. The noise suppressing structure may be coupled within the recess of the track beam.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1A:
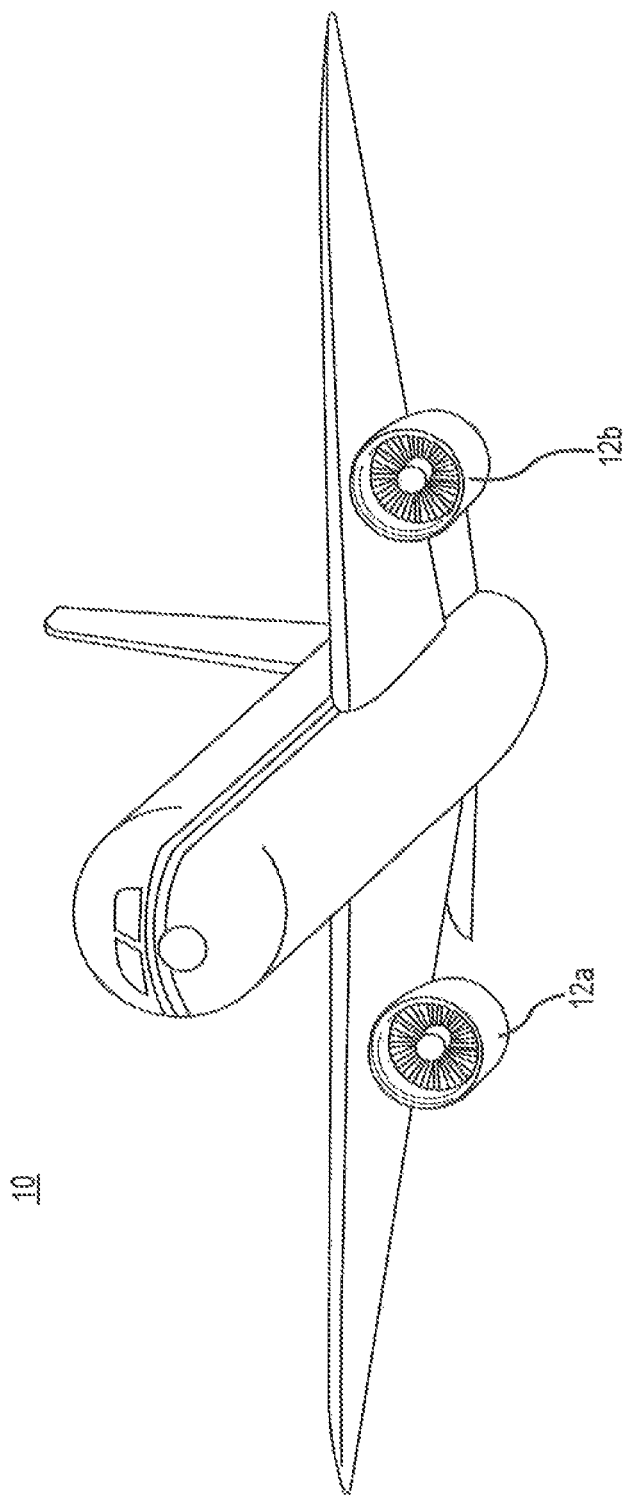
FIG. 1A illustrates, in accordance with various embodiments, a perspective view of a aircraft having a turbofan propulsion system.
Figure 1B:
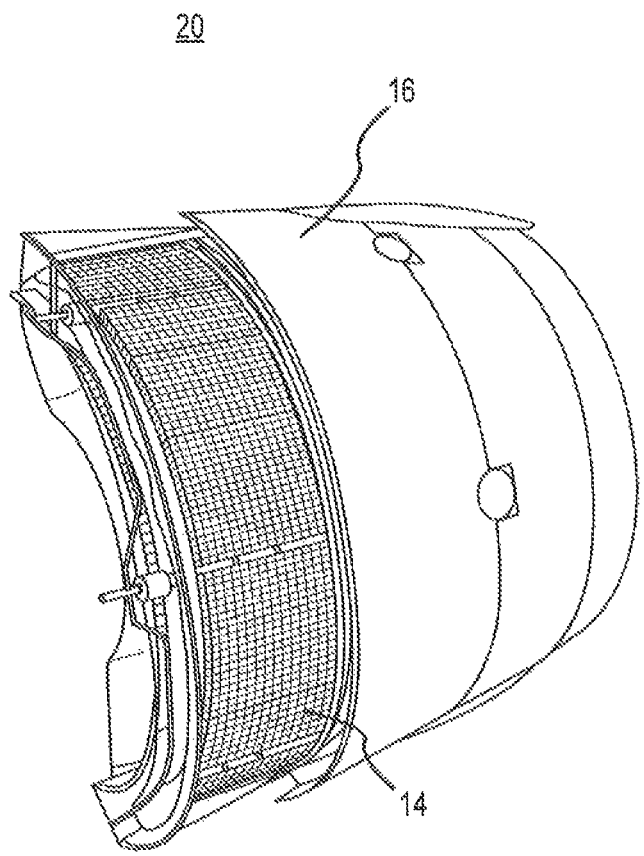
FIG. 1B illustrates, in accordance with various embodiments, a perspective view of a thrust reversing assembly of a turbofan propulsion system.

With reference to FIGS. 1A and 1B, jet aircraft, such as jet aircraft 10, typically include one or more jet engines 12a and 12b. These jet engines 12a and 12b typically include a nacelle comprising a thrust reversing structure or assembly 20 (or a simply thrust reverser). The thrust reverser includes a structure known as a cascade 14 as well as a structure known as a translating sleeve 16. The cascade 14 comprises a plurality of vents that redirect airflow during certain operations (e.g., landing) to generate reverse thrust. The translating sleeve 16 comprises a tapering generally cylindrical and/or partially (e.g., semi-cylindrical) structure. The translating sleeve 16 may be disposed about the cascade 14 in a stowed position. The translating sleeve 16 may translate from a forward position to a more aft position during deployment (i.e., engagement of the thrust reverser) to expose the cascade 14. Thus, during flight, a cascade 14 may be stowed or enclosed within a translating sleeve 16 to prevent reverse thrust. During landing, however, the translating sleeve 16 may translate aft to expose the cascade 14.

The translating sleeve 16 may be mounted on one or more track beams. These track beams may include one or more tracks or grooves, and the translating sleeve 16 may be coupled (e.g., as through a tongue-in-groove structure) to each of the track beams. The translating sleeve 16 may thus translate relative to the track beam along these grooves.

Figure 1C:
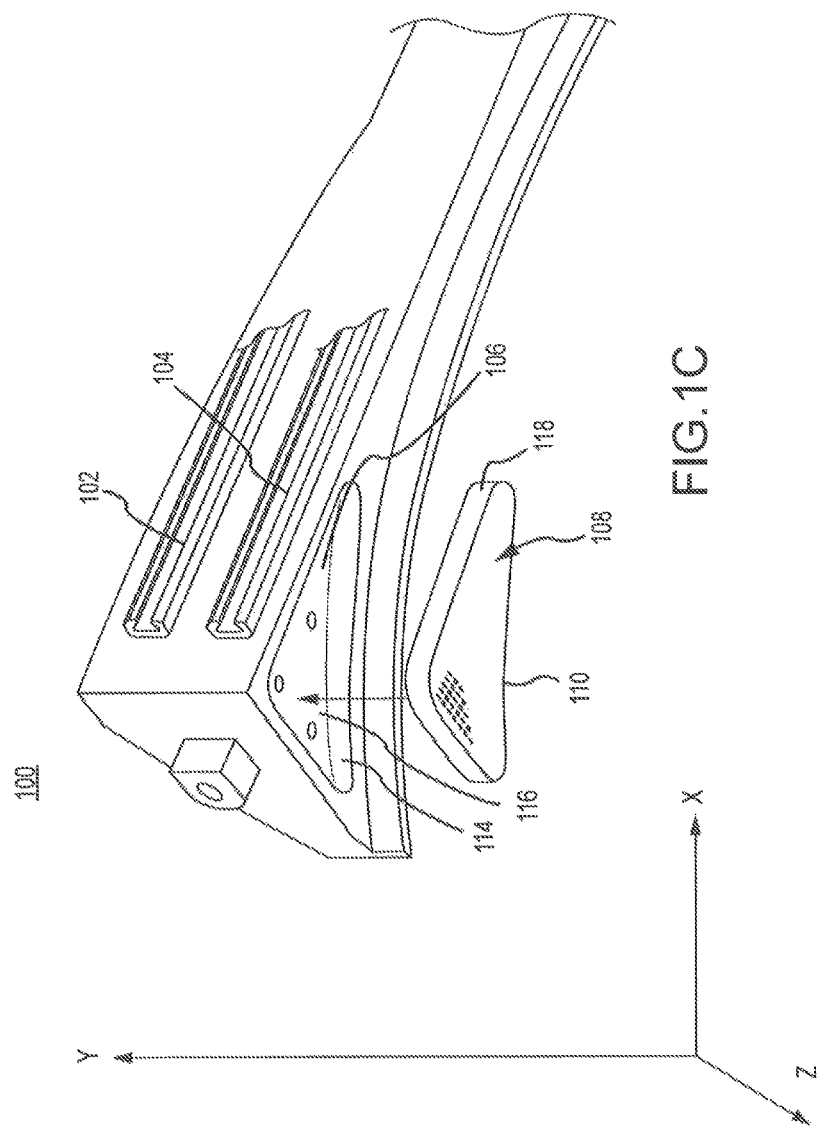
FIG. 1C illustrates, in accordance with various embodiments, a first side perspective view of a track beam of a turbofan propulsion system.

Therefore, in various embodiments, and with reference to FIG. 1C, a track beam 100 may comprise one or more channels or grooves 102 and 104. As described above, a translating sleeve 16 may be coupled to the track beam 100, and the sleeve 16 may translate in forward and aft directions along grooves 102 and 104. In particular, the sleeve 16 may translate aft to expose a cascade 14. In addition, the sleeve 16 may translate forward to cover or enclose a cascade 14.

In various embodiments, a recess 106 (such as a cavity and/or pocket) may be formed in a portion of the track beam 100. The recess 106 may be defined by a perimeter 114 and a reception surface 116. The surface 116 may extend parallel to the plane defined, as shown, by the z-axis and the x-axis. The perimeter 114 may extend away from the surface 116 along the plane defined by the z axis and y axis. The recess 106 may comprise any of a plurality of shapes and depths. For example, as shown, the recess 106 may comprise a generally triangular shape. The recess 106 may be shaped, in addition, to conform to a shape of a track beam 100. Thus, as the track beam may generally taper from forward to aft, the recess 106 may likewise taper from forward to aft. Likewise, surface 116 of the recess 106 may taper from a first depth to a second depth.

A noise suppression structure 108 may be inserted into recess 106 and coupled to track beam 100 within recess 106 or otherwise coupled within recess 106. The noise suppressing structure 108 may comprise, in various embodiments, any suitable structure for the suppression of noise.

Figure 2:
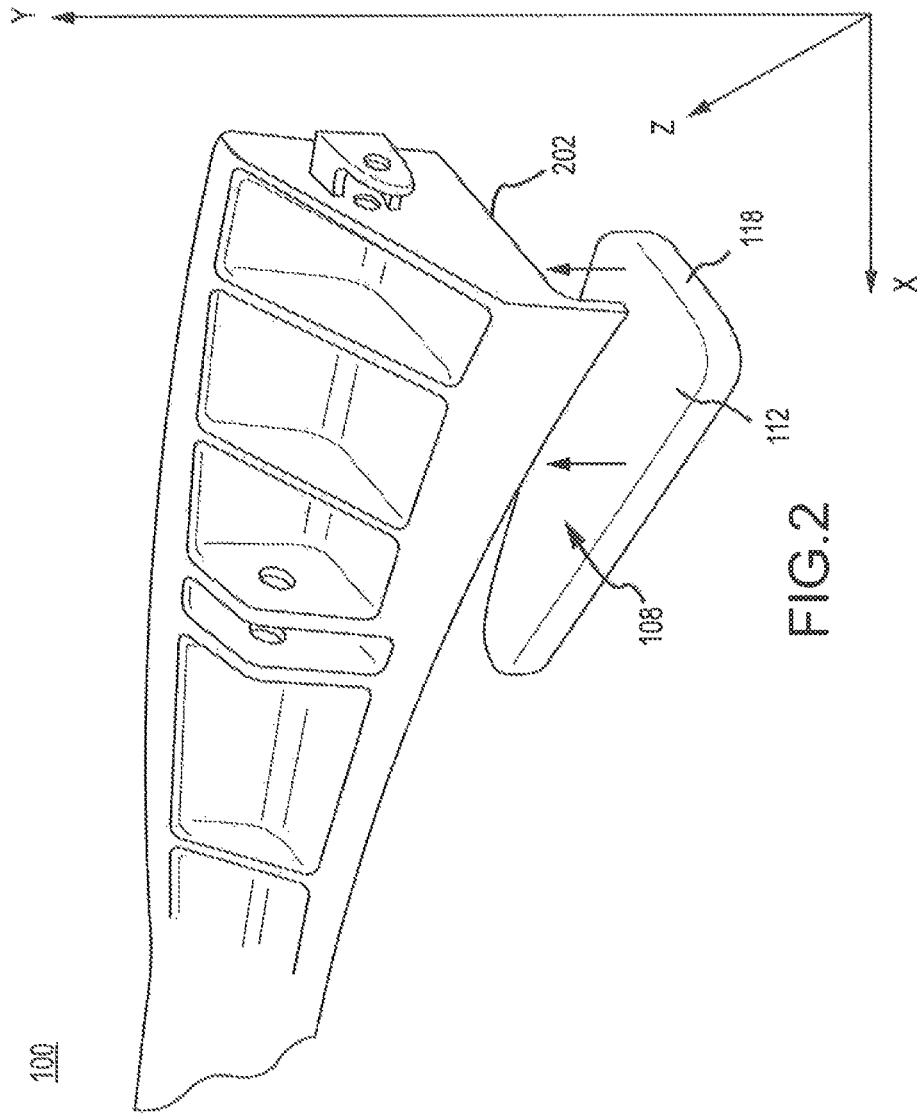
FIG. 2 illustrates, in accordance with various embodiments, a second side perspective view of a track beam of a turbofan propulsion system.

For example, the noise suppressing structure 108 may comprise a latticework of hexagonal cells. Each cell comprising the latticework may comprise a perforated front face 110 and a (non-perforated) back face 112, as shown in FIG. 2. Cells may be configured to cancel and/or suppress sound waves of various wavelengths. The depth of a cell may extend along the y axis, as shown FIG. 1. The depth of each cell may be configured in accordance with the sound wave length that is desired to be canceled and/or suppressed. For example, a depth of a cell may be configured to be one half, one quarter, and/or one eighth as long as of the sound wave length that is desired to be canceled and/or suppressed, among other lengths. In that regard, the perforated front face 110 may receive a sound wave (e.g., a sound wave generated by the operation of a jet aircraft). The sound wave may travel through one or more perforations comprising the perforated front face, through one or more cells, to reflect off back face 112. As the sound wave (having reflected off back face 112) returns to exit perforated front face 110, the sound wave may be out of phase (e.g., 90 degrees or 180 degrees out of phase) with the portion of the sound wave entering the perforated front face 110. For example, where a length of a cell is configured to be one quarter the length of the sound wave length that is desired to be canceled and/or suppressed, the reflected sound wave as it emerges from the cell may be 180 degrees out of phase of the incoming sound wave. Thus, as the phase shifted sound wave exits the perforated front face 110, it may destructively interfere with the portion of the sound wave entering the perforated face 110 to cancel or suppress both waves. A sound wave that is 180 degrees out of phase of an incoming sound wave will cancel or substantially cancel the incoming sound wave, i.e., the waves will sum to 0. Thus, noise may be suppressed by the noise suppressing structure 108. In addition, the noise suppressing structure 108 may comprise a bulk absorber such as an open celled foam and/or the like.

The noise suppressing structure 108 may comprise a volume defined by the front face 110, the back face 112 and a perimeter 118. The front face 110 and the back face 112 may extend generally parallel to one another. For example, the front face 110 may extend parallel to a first plane defined by the z-axis and the x-axis. The second face 112 may extend parallel to a second plane defined by the z-axis and the x-axis. The perimeter 118 may extend between the front face 110 and the second face 112 and extend substantially perpendicular to the faces, for example, along the y axis.

The noise suppressing structure 108 may comprise any shape suitable for insertion within the recess 106. For example, the noise suppressing structure may comprise a generally triangular shape. Similarly, as the track beam 100 may taper from forward to aft, so too may the noise suppressing structure 108.

The noise suppressing structure 108 may be coupled to the track beam 100 within the recess 106 by any suitable means. For example, the noise suppressing structure 108 may be coupled within the recess by way of one or more rivets, one or more screws, one or more bolts and/or nuts, by way of an adhesive, by way of pressure fitting, by way of heat bonding, and the like.

Referring to FIG. 2, a second perspective view of the track beam 100 is shown. This second perspective view shows the track beam 100 from a perspective that is radially opposite the view depicted in FIG. 1. That is, the second perspective view shows the track beam 100 from the vantage point of the minus z-axis. As shown, the noise suppressing structure 108 may be coupled within the recess 106. In particular, the recess 106 may be disposed within a lateral surface of the track beam 100. The lateral surface may face in the direction of the minus y-axis.

Thus, as described herein, a track beam 100 may be formed or constructed such that the track beam 100 includes a noise suppressing structure 108. The noise suppressing structure 108 may be further coupled to generally lateral reception surface 202 of the track beam 108. The noise suppressing structure 108 may suppress and/or cancel noise generated by the engine and/or the aircraft itself. Thus, overall, noise generated by the aircraft and/or aircraft engine may be further muffled or suppressed for quieter aircraft and/or aircraft engine operation. In addition, since the track beam 100 includes a recess 106, the track beam 100 may have less mass (and so weigh less) than other conventional track beams (e.g., those without such cavities).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle comprising:
    a thrust reverser track beam comprising a lateral surface;
    a recess in the lateral surface, the recess defined by a reception surface;
    a perimeter surface surrounding the reception surface and extending away from the reception surface,
    wherein the reception surface and the perimeter surface bound the recess; and
    a noise suppressing structure located within the recess, the noise suppressing structure comprising a perforated front face and a plurality of cells, wherein the plurality of cells are located between the perforated front face and the reception surface.

2. The nacelle of claim 1, wherein the recess is generally triangular in shape and extends away from a plane.

3. The nacelle of claim 1, wherein the noise suppressing structure is generally triangular in shape and extends away from a plane.

4. The nacelle of claim 1, wherein the noise suppressing structure is coupled within the recess of the thrust reverser track beam.

5. The nacelle of claim 1, wherein the noise suppressing structure is coupled to the thrust reverser track beam.

6. The nacelle of claim 4, wherein the noise suppressing structure is coupled within the recess of the thrust reverser track beam by at least one of: a rivet, a screw, a bolt, a nut, an adhesive, a pressure fitting, and heat bonding.

7. The nacelle of claim 5, wherein the noise suppressing structure is coupled to the thrust reverser track beam by way of at least one of: a rivet, a screw, a bolt, a nut, an adhesive, a pressure fitting, or heat bonding.

8. A nacelle comprising:
    a track beam comprising an elongate member having at least one track, the at least one track configured to receive a housing capable of translating forward an aft along the elongate member, the elongate member including:
        a recess in a lateral surface of the elongate member, the recess having a reception surface; and
        a perimeter surface surrounding the reception surface and extending away from the reception surface;
    a noise suppressing structure located within the recess, the noise suppressing structure comprising a perforated front face and a plurality of cells, wherein the plurality of cells are located between the perforated front face and the reception surface; and
    a cascade array configured to direct airflow during a reverse thrust mode, the housing translating forward to cover the cascade array in a stowed configuration and translating aft to expose the cascade array in a deployed configuration.

9. The nacelle of claim 8, wherein the reception surface and the perimeter surface bound the recess, such that the recess is configured to receive the noise suppressing structure.

10. The nacelle of claim 8, wherein the recess is generally triangular in shape and extends away from a plane.

11. The nacelle of claim 8, wherein the noise suppressing structure is generally triangular in shape and extends away from a plane.

12. The nacelle of claim 8, wherein the noise suppressing structure is coupled within the recess of the track beam.

13. An aircraft nacelle comprising a thrust reverser, the thrust reverser comprising:
    a track beam having a track in a first surface supporting a translating sleeve; and
    a noise suppressing structure coupled to a lateral surface contiguous to the first surface of the track beam, wherein the noise suppressing structure is located within a recess formed in the track beam, the noise suppressing structure comprising a perforated top skin and a plurality of cells adjacent to and under the perforated top skin, the plurality of cells configured to reflect sound waves that propagate into the plurality of cells through the perforated top skin.

14. The aircraft nacelle of claim 13, wherein the noise suppressing structure comprises a back skin adjacent to the plurality of cells which partially defines the plurality of cells.

15. The aircraft nacelle of claim 13, wherein the noise suppressing structure is bonded to the track beam.

16. The aircraft nacelle of claim 13, wherein the noise suppressing structure is mechanically fastened to the track beam.

* * * * *